United States Patent [19]
Ward et al.

[11] Patent Number: 5,857,781
[45] Date of Patent: Jan. 12, 1999

[54] BEARING APPARATUS HAVING IMPROVED END COVER

[75] Inventors: Robert E. Ward; Howard M. Martinie, both of Simpsonville, S.C.

[73] Assignee: Reliance Electric Industrial Company, Cleveland, Ohio

[21] Appl. No.: 711,371

[22] Filed: Sep. 5, 1996

[51] Int. Cl.[6] .................................................... F16C 19/00
[52] U.S. Cl. ............................................................ 384/489
[58] Field of Search ................................... 384/489, 903, 384/130, 474, 537

[56] References Cited

PUBLICATIONS

"RHP Bearings: Bearings Replacement Handbook", p. 200 Dated Jan. 1990.
"Dodge Engineering Catalog", vol. 1.1, pp. 82–101, Dated 1989.

*Primary Examiner*—Lenard A. Footland
*Attorney, Agent, or Firm*—Craig N. Killen; John M. Miller; John J. Horn

[57] ABSTRACT

A bearing apparatus is provided including an improved end cover. The end cover has a cup element for receipt over the end of a shaft supported by the bearing apparatus. An arm element extends from the cup element and may define a slot for receipt of a suitable threaded member, such as the bearing's lubricant fitting. When the lubricant fitting is tightened, the end cover will be maintained in the desired position on the bearing housing.

21 Claims, 7 Drawing Sheets

BEARING APPARATUS HAVING IMPROVED END COVER

BACKGROUND OF THE INVENTION

The present invention relates generally to the art of bearings for facilitating shaft rotation. More particularly, the invention relates to a bearing apparatus utilizing an improved end cover mounted to the bearing housing.

In many situations, it is desirable to cover the end of a shaft supported by a bearing apparatus. In particular, an end cover mounted to the bearing housing may inhibit undesirable exposure to the rotating shaft during operation. The end cover will also tend to prevent extraneous dirt or moisture from entering the bearing housing.

Prior art end covers have typically been attached to the bearing housing utilizing gripping fingers extending into the housing's shaft bore. These gripping fingers may engage the outer ring member of the bearing assembly within the shaft bore, or may engage the inner surface of the shaft bore itself. While these arrangements have effectively mounted the end cover, they are limited to applications in which access to the shaft bore is not otherwise impeded. Certain arrangements for clamping the shaft to the inner ring member of the bearing assembly may make the use of such end covers difficult or even impossible.

SUMMARY OF THE INVENTION

The present invention recognizes and addresses the foregoing disadvantages, and others, of prior art constructions and methods. Accordingly, it is an object of the present invention to provide a novel bearing apparatus.

It is a more particular object of the present invention to provide a bearing apparatus utilizing an improved end cover.

It is also an object of the present invention to provide a bearing end cover that connects to the bearing housing utilizing a radially extending threaded member mounted on the bearing housing.

Some of these objects are achieved by a bearing apparatus for supporting a rotatable shaft. The bearing apparatus comprises a bearing housing defining a shaft bore for receipt of the rotatable shaft therethrough. A bearing assembly is located in the bearing housing and includes a rotatable ring operatively secured to the shaft.

The bearing apparatus further includes a cover device including a cup element configured to be received over the shaft bore on one side of the bearing housing. The cup element may comprise a cylindrical member having a first axial end and a second axial end. The first axial end may be open for receipt of the rotatable shaft, with the second axial end having a radial web extending thereacross. The cover device also comprises an arm element extending radially outward from the cup element and adapted to be connected to the bearing housing such that the cup element will be maintained in position.

In exemplary embodiments, the bearing housing includes a threaded member mounted thereon. In this case, the arm element of the cover device is configured to be received about the threaded member such that the cover device will be connected to the bearing housing. The threaded member used for this purpose may advantageously be the lubricant fitting already provided on the bearing housing.

The arm element may include a first portion extending from a proximal location at the cup element to a distal location radially spaced therefrom. A second portion of the arm element may extend from the distal location to the threaded member.

In one construction, the second portion of the arm element defines a slot for receipt about the threaded member. A washer member may be mounted in the slot for engaging the threaded member.

Other objects of the invention are achieved by a bearing end cover for use with a bearing housing defining a shaft bore, the bearing housing further having a radially extending threaded member, such as a lubricant fitting. The end cover comprises a cup element configured to be received over the shaft bore on one side of the bearing housing. An arm element extending from the cup element is adapted to be received about the threaded member. As a result, the end cover will be connected to the bearing housing.

In exemplary embodiments, the cup element and the arm element are constructed as a unitary body. The cup element may comprise a cylindrical member having a first axial end and a second axial end. The first axial end may be open, with the second axial end having a radial web extending thereacross.

The arm element may include a first portion extending from a proximal location at the cup element to a distal location radially spaced therefrom. In this case, the arm element further comprises a second portion extending from the distal location to the threaded member. The second portion of the arm element may define a slot for receipt about the threaded member.

A washer member may be mounted in the slot for engaging the threaded member. In this case, the slot may be configured such that the washer member is axially moveable therein to accommodate various axial positions for the threaded member. The washer member may be configured as a C-shaped washer or as an O-shaped washer.

In other exemplary embodiments, a clip member may be utilized instead of a washer. Preferably, the clip member includes a connection portion received in the slot and a retaining portion engaging the arm element. The connection portion preferably defines a hole through which the threaded member extends.

In some exemplary embodiments, the first portion of the arm element may tangentially taper from an outer surface of the cylindrical member to the distal location. In addition, a textured outer surface may be defined on the cylindrical member for faciltating gripping thereof by a user.

The radial web of the cylindrical member may define a knock-out portion which is removable to expose a circular hole. The circular hole is located to permit a shaft to extend therethrough. In one preferred construction, the knock-out portion is defined by a plurality of concentric circles formed by respective scores defined in the radial web.

Other objects of the invention are achieved by a method of covering an end of a rotatable shaft supported by a bearing apparatus. The method includes the step of providing an article having a cup element defining an open end and a closed end. The article is placed adjacent one side of the bearing housing such that the open end receives therein the end of the shaft. An arm element extending from the cup element is connected to an element radially protruding from the bearing housing such that the arm element and the cup element are maintained in position. Preferably, the element radially protruding from the bearing housing is a lubricant fitting which is tightened to secure the arm element in position.

Other objects, features and aspects of the present invention are provided by various combinations and subcombinations of the disclosed elements, as well as methods of utilizing same, which are discussed in greater detail below.

Figure 1:
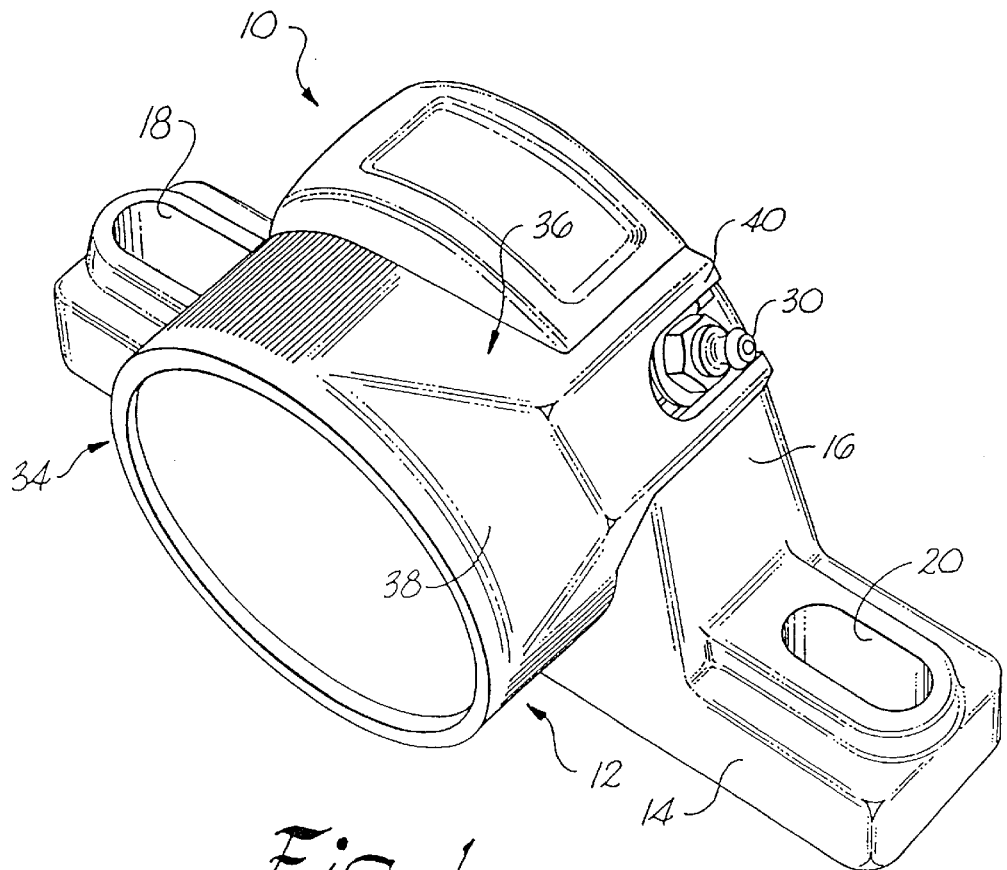
FIG. 1 is a perspective view of an improved end cover constructed in accordance with the present invention as mounted to a bearing housing.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates an exemplary bearing apparatus constructed in accordance with the present invention. The bearing apparatus includes a bearing housing 10 having an improved end cover 12 connected thereto. In this case, housing 10 is configured as a pillow block having a flat base portion 14 extending into an integral upper portion 16. Holes 18 and 20 are defined in base portion 14 for receipt of respective mounting bolts when housing 10 is placed in a desired location for use.

Figure 2:
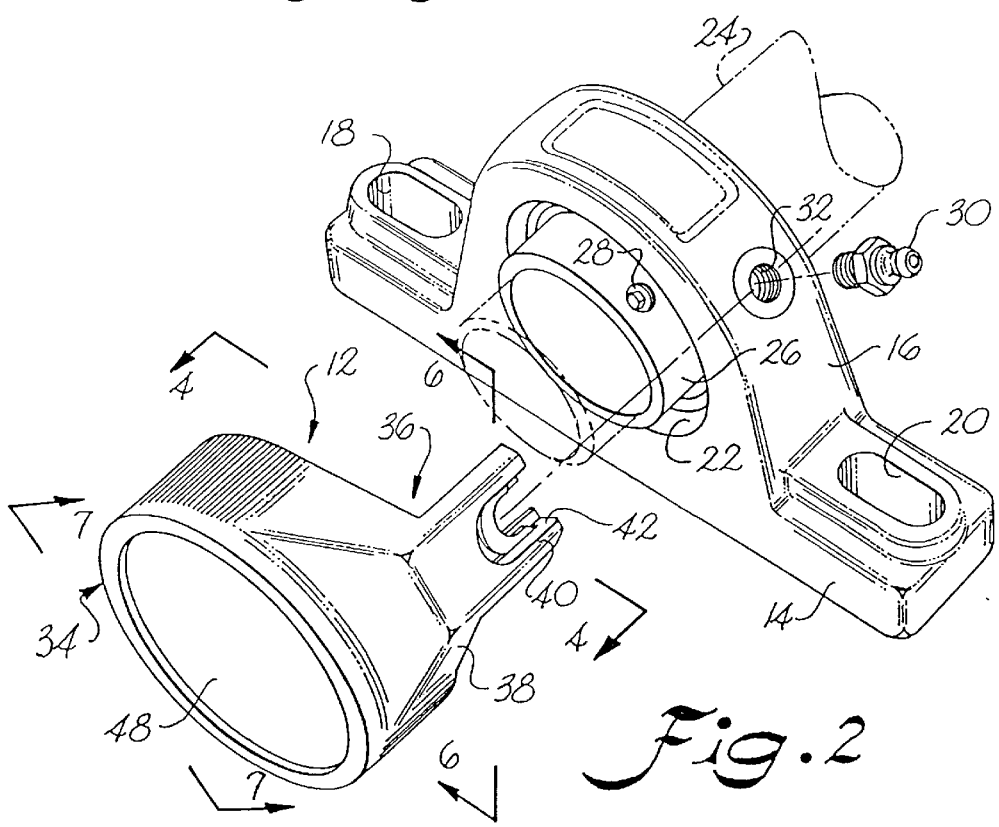
FIG. 2 is a perspective view showing the manner in which the bearing end cover of FIG. 1 may be attached to the bearing housing.

As can be seen in FIG. 2, upper portion 16 of housing 10 defines a shaft bore 22 for receipt of a rotatable shaft 24 therethrough. A suitable bearing assembly is located within the upper portion 16 for facilitating operative rotation of shaft 24. The bearing assembly includes a rotatable ring 26 secured to shaft 24 for rotation therewith. In the illustrated embodiment, such securement is effected by setscrews, such as setscrew 28, extending through threaded holes defined in ring 26. The bearing assembly may be lubricated utilizing a lubricant fitting 30 threaded into a radial hole 32 defined in upper portion 16.

Typically, the bearing assembly located within upper portion 16 will be constructed as a bearing insert having a bearing outer ring member radially spaced from ring 26. The outer ring member will define an outer race on its inside surface, with ring 26 defining an opposed inner race on its outside surface. A plurality of bearing elements, such as ball bearings or tapered roller bearings, may be disposed in the space between the inner and outer races. In an alternative construction, the outer race is defined on the inner surface of shaft bore 22.

Although the securement arrangement shown in the illustrated embodiment does not substantially impede access to shaft bore 22, this may not be the case with other securement arrangements that may be used. For example, the securement arrangement shown in U.S. Pat. No. 5,417,500 utilizes a clamping collar extending about clamping fingers defined in the rotatable ring. The clamping collar has an outer diameter in many cases that may be larger than the diameter of the shaft bore. This may also be the case with various eccentric collar clamping arrangements, and the like.

Unlike prior art end covers, end cover 12 is configured to be connected to housing 10 independently of shaft bore 22. In this regard, end cover 12 is constructed having a cup element 34 integrally extending into an arm element 36. Arm element 36 includes a first portion 38 tangentially tapering from a proximal location at the outer surface of cup element 34 to a distal location radially spaced therefrom. A second portion 40 axially extends from this distal location to lubricant fitting 30.

Figure 3:
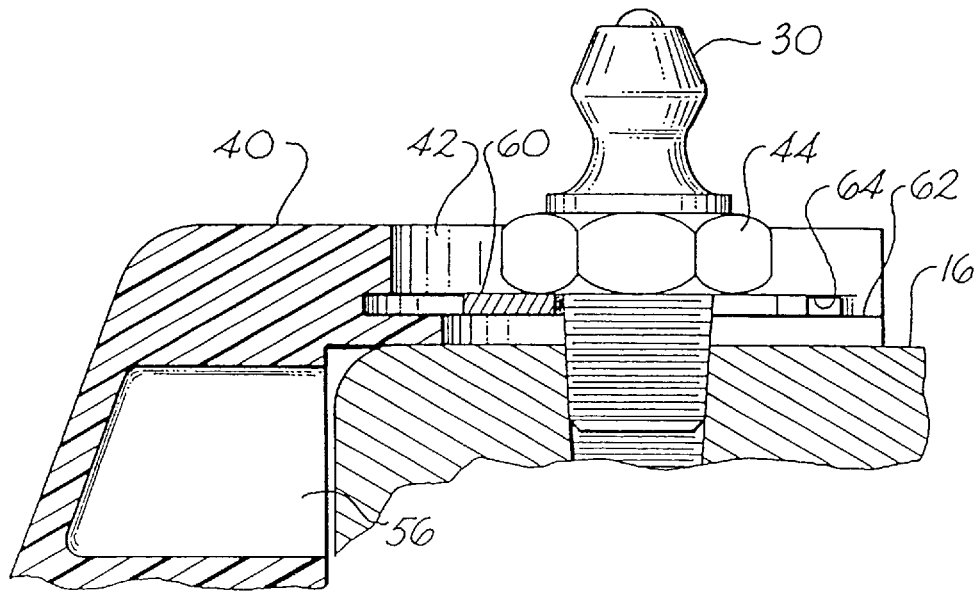
FIG. 3 is an enlarged fragmentary view showing the lubricant fitting of the bearing housing engaging an arm element of the end cover.
Figure 7:
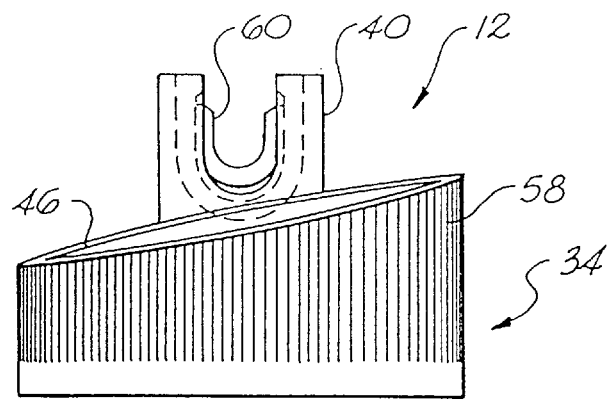
FIG. 7 is an elevational view as taken along line 7—7 of FIG. 2.
Figure 4:
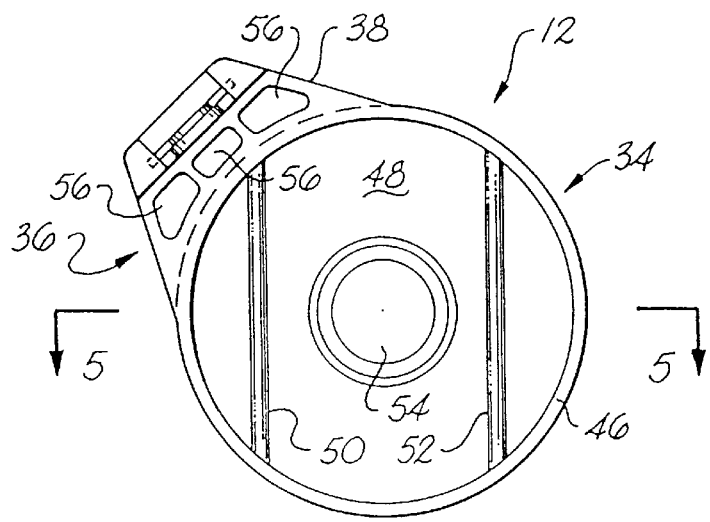
FIG. 4 is an elevational view as taken along line 4—4 of FIG. 2.
Figure 5:
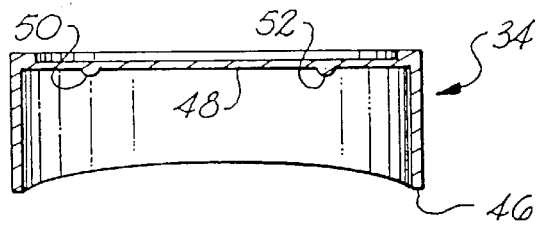
FIG. 5 is a cross-sectional view as taken along 5—5 of FIG. 4.
Figure 6:
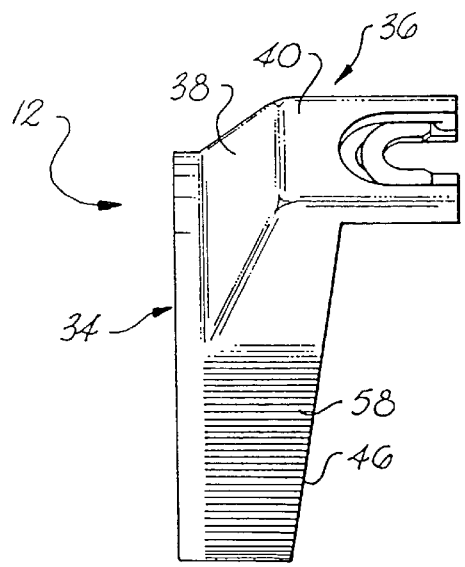
FIG. 6 is an elevational view as taken along line 6—6 of FIG. 2.

Referring now to FIG. 3, second portion 40 of arm element 36 is configured for receipt about a suitable radially extending member mounted to housing 10. In presently preferred embodiments, lubricant fitting 30, which is already provided on housing 10, is advantageously utilized for this purpose.

In this case, a longitudinal slot 42 is defined in second portion 40 for receipt about lubricant fitting 30. Slot 42 preferably defines an appropriate ledge or the like that may be engaged by a flange on lubricant fitting 30. Such a flange is defined by polygonal portion 44, which is used to tighten or loosen lubricant fitting 30 within radial hole 32.

Referring now to FIGS. 4–7, the construction of end cover 12 may be explained in greater detail. As can be seen, cup element 34 is generally cylindrical in shape and includes a first axial end 46 that will juxtapose the outer surface of upper portion 16 during use. End 46 is open to receive shaft 24 therein, and preferably has a diameter greater than the diameter of shaft bore 22. As a result, cup element 34 will be able to receive various clamping arrangements that may themselves have a greater diameter than the shaft bore.

A radial web 48 extends across the second axial end of cup element 34. Because the outer surface of housing 10 is slanted in this case, first axial end 46 is angled such that radial web 48 will be situated nearly exactly transverse to the axis of shaft 24. This angled configuration of first axial end 46 can be most easily seen in FIGS. 6 and 7.

In exemplary embodiments, end cover 12 may be constructed as a unitary element of a suitable polymeric material, such may be produced utilizing injection molding techniques. Voids 56 may be defined as shown in the back side of arm element 36 to reduce the amount of requisite material while still providing desired integrity. The cylindrical outer surface of cup element 34 may be knurled or otherwise suitably textured, as indicated at 58, to facilitate gripping by an installer. In exemplary embodiments, the polymeric material is colored yellow to indicate a rotating shaft.

In some embodiments, radial web 48 may include one or more support ribs extending thereacross, such as support ribs 50 and 52. In other embodiments, it may be desirable not to include such support ribs.

A knock-out portion 54 may be defined in the center of radial web 48 to accommodate through-shafts. In particular, knock-out portion 54 may be removed if the shaft has a length that requires it to extend through radial web 48. In the illustrated embodiment, knock-out portion 54 is defined by a plurality of concentric circles formed by respective scores. In this manner, the size of the resulting hole can be adjusted depending on the size of the shaft.

Figure 8:
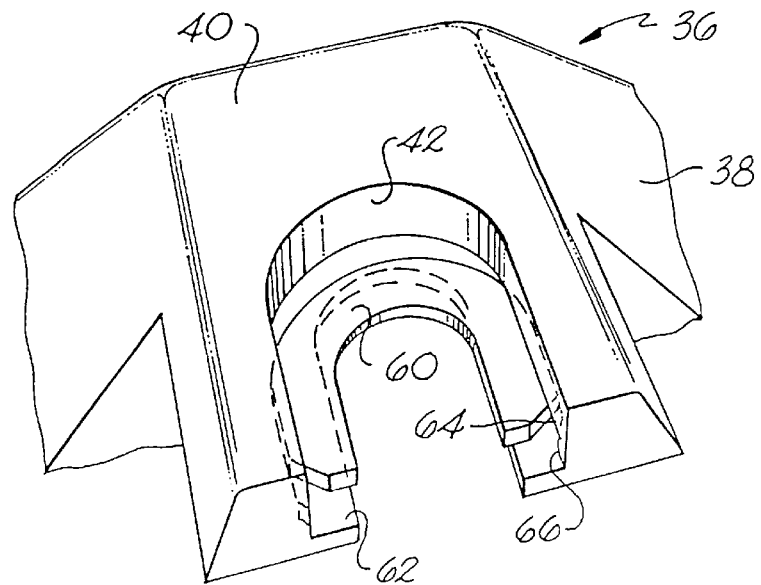
FIG. 8 is an enlarged fragmentary view of the arm element of the end cover illustrating a C-shaped washer movably mounted therein.

Referring now to FIG. 8, a metallic washer 60 may be located in slot 42 to engage the polygonal portion 44 of lubricant fitting 30. In this embodiment, washer 60 is configured as a C-shaped washer so that end cover 12 can be connected without removing lubricant fitting 30. In particular, lubricant fitting 30 is simply backed out of hole 32 a sufficient amount to accommodate washer 60. Lubricant fitting 30 is the then tightened against washer 60 to maintain end cover 12 in position. It will generally not be necessary in this case to completely remove lubricant fitting 30 in order to connect end cover 12.

As illustrated, washer 60 rests on a ledge 62 defined in slot 42. In particular, washer 60 partially extends into respective recesses 64 and 66 defined in the opposite sides of slot 42 above ledge 62. Washer 60 is axially movable in the recesses to accommodate various axial positions at which the lubricant fitting of a particular bearing housing may be located. Integral stops, such as stop 66, may be defined to prevent washer 60 from moving completely out of slot 42.

Figure 9:
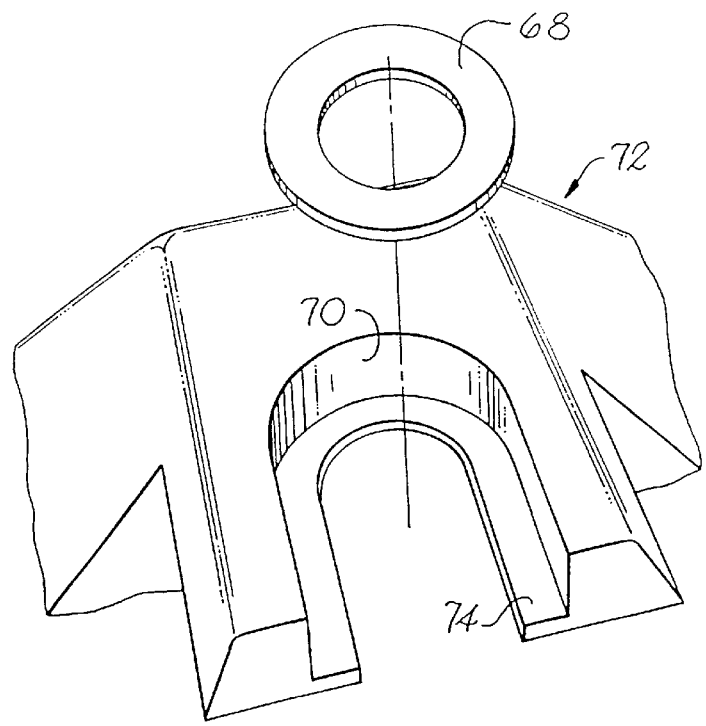
FIG. 9 is a view similar to FIG. 8 of an alternative arm element utilizing an O-shaped washer.

FIG. 9 illustrates an alternative embodiment utilizing an O-shaped washer 68. As shown, washer 68 is received in a slot 70 defined in arm element 72. Slot 70 includes an integral ledge 74 to support washer 68 during use. It will be appreciated that the use of an O-shaped washer will generally require lubricant fitting 30 to be removed when the end cover is installed.

Figure 10:
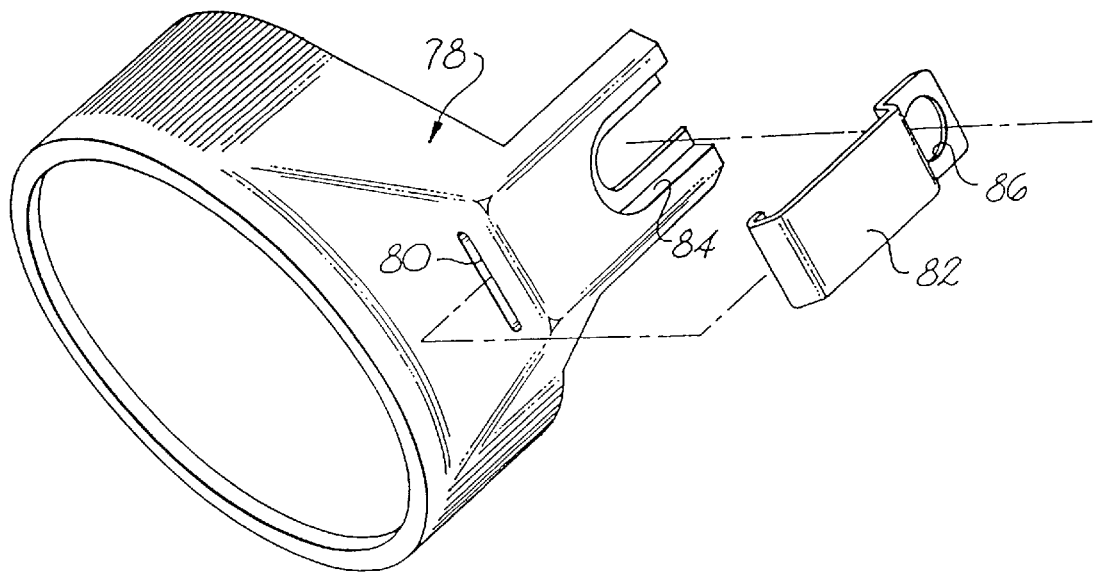
FIG. 10 is a perspective assembly view showing an alternative end cover utilizing a retaining clip.
Figure 11:
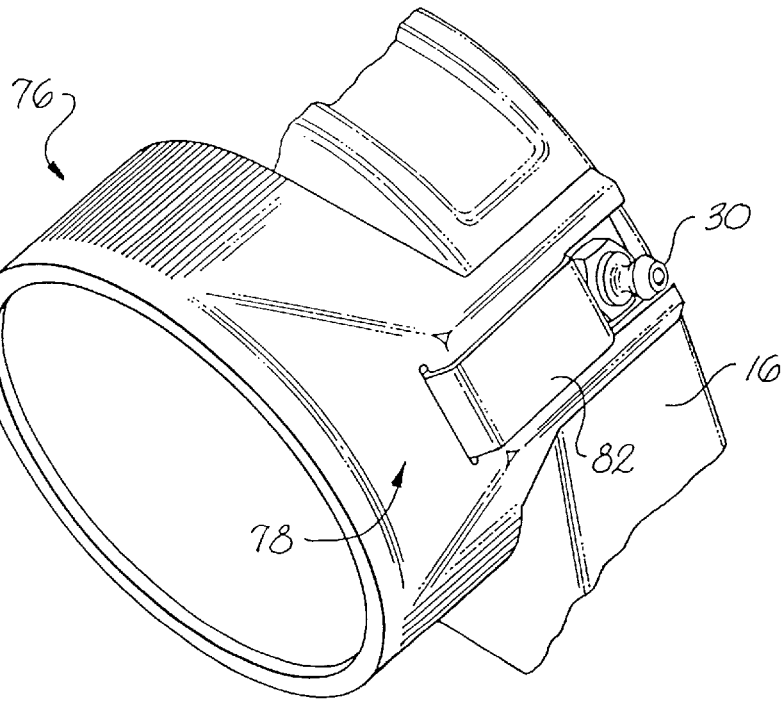
FIG. 11 is a perspective view of the end cover shown in FIG. 10 as mounted to a bearing housing.

FIGS. 10 and 11 illustrate an alternative end cover 76 which may be desirable in certain applications. In this case, arm element 78 defines a receiving groove 80 in the outer surface thereof, as illustrated. A clip member 82 includes a retaining portion that "hooks" into groove 80, thereby engaging arm element 78. Clip member 82 further includes a connection portion received in slot 84. The connection portion defines a hole 86 through which lubricant fitting 30 may extend.

Figure 12:
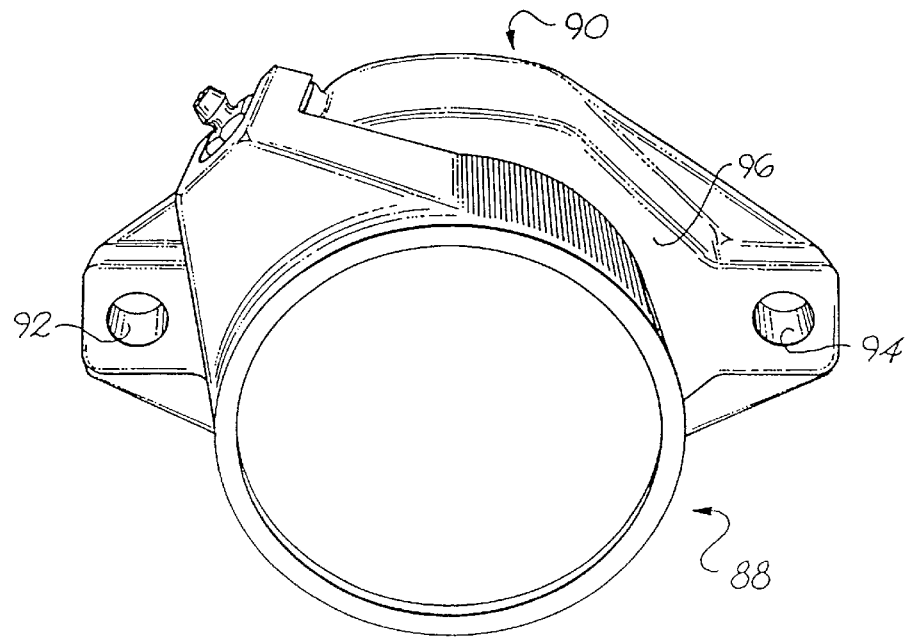
FIG. 12 is an isometric view of an alternative end cover mounted to a two-hole flange bearing.

While the above embodiments were illustrated with respect to a pillow block housing, it should be appreciated that embodiments of the invention may be utilized with various other bearing housings. For example, FIG. 12 illustrates an end cover 88 utilized with a flange housing 90. In particular, flange housing 90 is of the type having two mounting holes, respectively indicated at 92 and 94. Because the front side 96 of housing 90 is generally planar, there is no need to angle the adjacent face of end cover 88 as was the case with the pillow block embodiments illustrated above.

Figure 13:
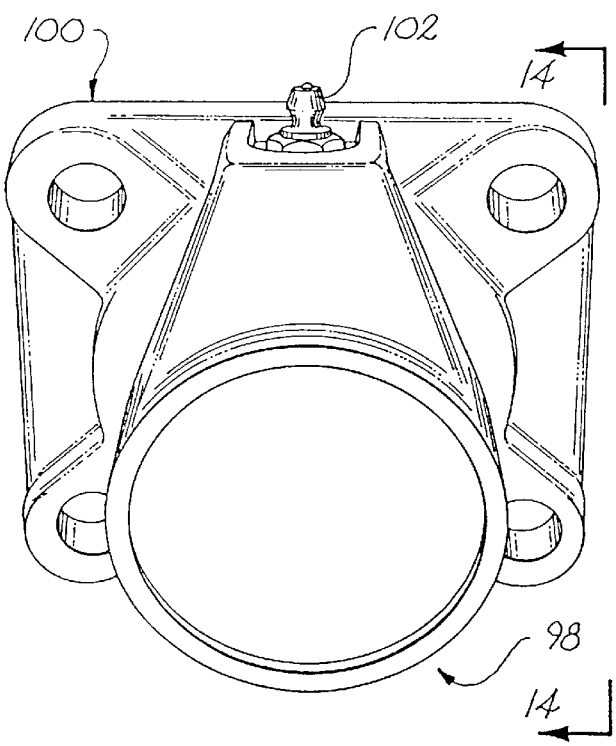
FIG. 13 is an isometric view of an alternative bearing end cover as mounted to a four-hole flange bearing.
Figure 14:
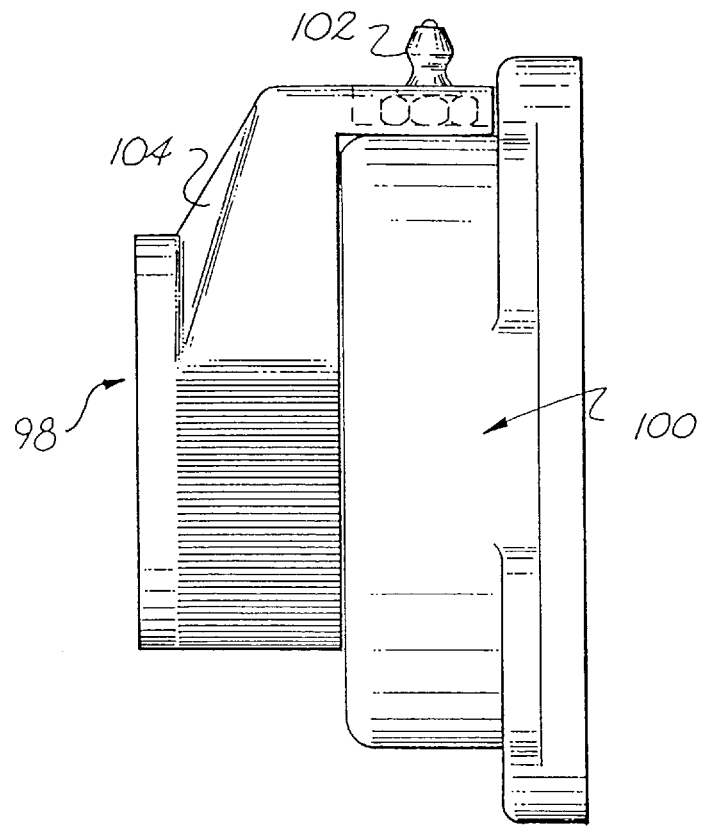
FIG. 14 is an elevational view as taken along line 14—14 of FIG. 13.

FIGS. 13 and 14 show an alternative end cover 98 utilized with a four-hole flange housing 100. In this case, lubricant fitting 102 is located at a distance radially farther from the shaft than in other embodiments. As such, the arm element 104 is constructed having a correspondingly greater radial extent. It should be appreciated, however, that many four-hole flange housings may not require a longer arm element.

While preferred embodiments of the present invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing apparatus for supporting a rotatable shaft, said bearing apparatus comprising;

a bearing housing defining a shaft bore for receipt of said rotatable shaft therethrough;

a bearing assembly located in said bearing housing, said bearing assembly including a rotatable ring operatively attached to said shaft; and a cover device including a cup element configured to be received over said shaft bore on one side of said bearing housing, said cover device further comprising an arm element extending radially outward from said cup element and adapted to be connected to said bearing housing such that such cup element will be maintained in position; and wherein said bearing housing includes a threaded lubricant fitting mounted thereon and said arm element is configured to be received about said lubricant fitting such that said cover device will be connected to said bearing housing.

2. A bearing apparatus as set forth in claim 1, wherein said arm element includes a first portion extending from a proximal location at said cup element to a distal location radially spaced therefrom, said arm element further comprising a second portion extending from said distal location to said threaded member.

3. A bearing apparatus as set forth in claim 2, wherein said second portion of said arm element defines a slot for receipt about said threaded member.

4. A bearing apparatus as set forth in claim 3, further comprising a washer member mounted in said slot for engaging said threaded member.

5. A bearing apparatus as set forth in claim 1, wherein said cup element comprises a second axial end having a radial web thereacross.

6. A method of covering an end of a rotatable shaft supported by a bearing apparatus, said method comprising steps of:

(a) providing an article having a cup element defining an open end and a closed end;

(b) placing said article adjacent one side of a bearing housing of said bearing apparatus such that said open end receives said end of said shaft therein; and (c) connecting an arm element extending from said cup element to an element radially protruding from said bearing housing such that said arm element and said cup element are maintained in position.

7. A method as set forth in claim 6, wherein said element radially protruding from said bearing housing is a lubricant fitting and step (c) involves tightening said lubricant fitting.

8. A bearing end cover for use with a bearing housing defining a shaft bore and further having a radially extending threaded member thereon, said end cover comprising:

a cup element configured to be received over said shaft bore on one side of said bearing housing, said cup element comprising a cylindrical member having a first axial end and a second axial end, said first axial end being open and said second axial end having a radial web extending thereacross, wherein said radial web defines a knock-out portion removable to define a circular hole therein, said circular hole being located to permit a shaft to extend therethrough; and an arm element extending from said cup element and adapted to be received about said threaded member such that said end cover will be connected to said bearing housing, and wherein said cup element and said arm element are constructed as a unitary body.

9. A bearing end cover as set forth in claim 8, wherein said knock-out portion is defined by a plurality of concentric circles formed by respective scores defined in said radial web.

10. A bearing end cover for use with a bearing housing defining a shaft bore and further having a radially extending threaded lubricant fitting thereon, said end cover comprising:

a cup element configured to be received over said shaft bore on one side of said bearing housing; and an arm element extending from said cup element and adapted to be received about said threaded lubricant fitting such that said end cover will be connected to said bearing housing, said arm element including a first portion extending from a proximal location at said cup element to a distal location radially spaced therefrom, said arm element further comprising a second portion extending from said distal location to said lubricant fitting, said second portion of said arm element defining a slot for receipt about said lubricant fitting.

11. A bearing end cover as set forth in claim 10, further comprising a washer member mounted in said slot for engaging said lubricant fitting.

12. A bearing end cover as set forth in claim 11, wherein said slot is configured such that said washer member is axially movable therein.

13. A bearing end cover as set forth in claim 11, wherein said washer member is configured as a C-shaped washer.

14. A bearing end cover as set forth in claim 11, wherein said washer member is configured as a O-shaped washer.

15. A bearing end cover as set forth in claim 10, further comprising a clip member including a connection portion received in said slot and a retaining portion engaging said arm element, said connection portion defining a hole through which said lubricant fitting extends.

16. A bearing end cover as set forth in claim 8, wherein said cup element and said arm element are constructed as a unitary body.

17. A bearing end cover as set forth in claim 16, wherein said cup element comprises a cylindrical member having a second axial end having a radial web extending thereacross.

18. A bearing end cover as set forth in claim 17, wherein said arm element includes a first portion extending from a proximal location at said cup element to a distal location radially spaced therefrom, said arm element further comprising a second portion extending from said distal location to said threaded member.

19. A bearing end cover as set forth in claim 17, wherein said radial web includes at least one supporting rib extending thereacross.

20. A bearing end cover as set forth in claim 17, wherein said cylindrical member has a textured outer surface.

21. A bearing end cover for use with a bearing housing defining a shaft bore and further having a radially extending threaded member thereon, said end cover comprising:

a cup element configured to be received over said shaft bore on one side of said bearing housing, said cup element comprising a cylindrical member having a first axial end and a second axial end, said first axial end being open and said second axial end having a radial web extending thereacross;

an arm element extending from said cup element and adapted to be received about said threaded member such that said end cover will be connected to said bearing housing, said arm element including a first portion extending from a proximal location at said cup element to a distal location radially spaced therefrom, said arm element further comprising a second portion extending from said distal location to said threaded member, said first portion of said arm element tangentially tapering from an outer surface of said cylindrical member to said distal location; and wherein said cup element and said arm element are constructed as a unitary body.

* * * * *